March 24, 1931.                I. S. BERGER                1,797,750
                            MOUNT FOR NEGATIVES
                            Filed Jan. 3, 1927
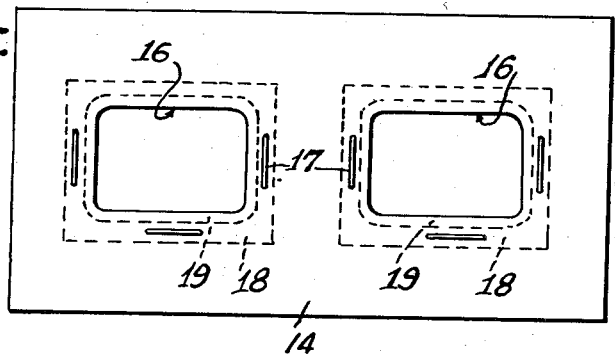
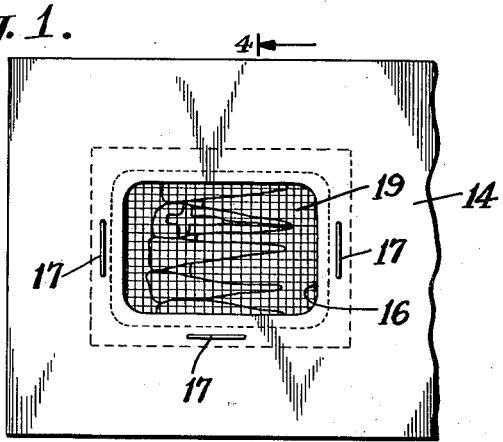
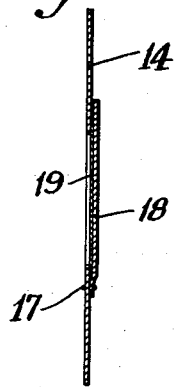
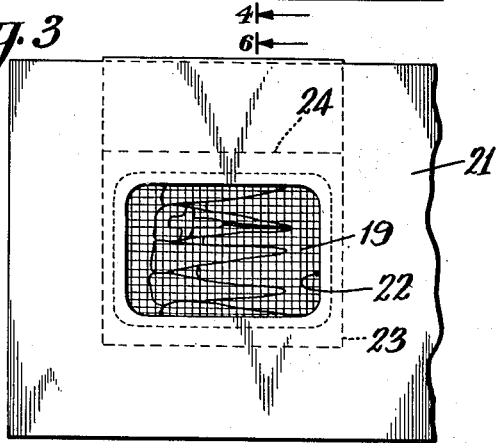
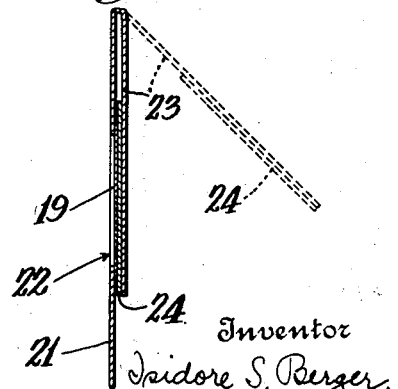
Inventor
Isidore S. Berger.
By his Attorneys
Bohleber + Ledbetter.

Patented Mar. 24, 1931

1,797,750

UNITED STATES PATENT OFFICE

ISIDORE S. BERGER, OF NEW YORK, N. Y.

MOUNT FOR NEGATIVES

Application filed January 3, 1927. Serial No. 158,541.

This invention relates to mounts for negatives, such as roentgenograms or photographic exposures, and to negatives for use with such mounts, and to a method of viewing negatives with the aid of the mounts.

Heretofore roentgenograms, for instance, have been viewed by transmitted light, that is, the negative has been held up before the light and the image viewed by light transmitted therethrough from the light source in back of the negative. Any light source cannot be used. In order that a properly exposed and developed negative, as now known, may be read intelligently, it must be viewed against a subdued light, such as a frosted or porcelain bulb or an ordinary bulb behind a milk glass. When viewed against a glaring electric light or the direct sunlight, the image looks thin and blurred and the proper diagnosis cannot be made. This has led to the use of a special X-ray viewing lamp, of which there are many on the market. The necessity for such a lamp adds to the expense of equipment and overhead in a dental office.

Moreover X-rays are harmful and cumulative in effect. Their effect does not wear off for several days. Consequently, they are harmful not only to a patient who has been previously exposed, but also to the operator and attendants, if insufficiently protected. Furthermore, the tube from which the X-rays are caused to emanate has only a predetermined period of usefulness before it is worn out and must be replaced. That is, the life of such tube is limited to a predetermined number of milliampere seconds of use.

In dental work, from 10 to 20 exposures for a full series of X-rays must be made with an average of 6 milliampere seconds per exposure, or from 60 to 120 milliampere seconds of total exposure. That is, with what is known commercially as a "regular" X-ray film, an exposure of from 4 to 6 seconds is required for each negative, using 10 milliamperes power with a 3 inch gap X-ray tube for a front tooth and for a back tooth from 6 to 7 seconds exposure. Thus the patient and the operator are subjected to from 60 to 120 seconds exposure to X-rays for each series of pictures taken and the life of the tube is reduced to that extent for each series.

The present invention has for its objects the provision of a mount and a negative which shall obviate the requirement of a viewing lamp and thus reduce materially the initial cost of equipment. The invention also has for its object a reduction in the time of exposure, thus reducing materially the deleterious effect of the X-rays on the patient and operator as well as prolonging the life of the tube and expediting the taking of X-ray pictures.

To these ends, it is proposed to view the X-ray negative, not by transmitted light, as heretofore, from a special light source in back of the negative, but by a reflected light from any convenient light source, artificial or natural, falling directly on the face of the negative. Accordingly, one aspect of the invention involves a mount for X-ray or other negatives which is provided with a smooth white substantially opaque backing for the negative; and, in another aspect, the invention contemplates a film exposed for a shorter period of time to produce a lighter negative upon which the image will show up clearly on such a backing and simulate a photographic print with the additional improvement over a print in that none of the details ordinarily lost in the subsequent process of printing are lost by this combination.

More particularly a mount having a window therein, in which the negative is to be disposed, is backed by a closure or backing consisting of a sheet of white celluloid or the equivalent, substantially opaque to transmitted light and having a glazed white or polished white surface and of an opacity which would make the image of an ordinarily exposed negative unfit for diagnosis, but which permits the less exposed film to be viewed both by reflected or transmitted light. The same effect may be obtained by the provision of a cardboard backing for the window which may be coated with a white smooth surface, or a white smoothed surface paper or the like may be applied to the cardboard to lie immediately behind the negative. By the term "white celluloid" a celluloid is intended which is known to the trade as "white". Such material is classified as opaque as distinguished from opal celluloid or opaline which is classified as transparent, and this classification is based upon the amount of pigment, usually zinc oxide, in the material.

The X-ray negative is exposed to a lesser degree than formerly for use in connection with the improved mount. For an anterior tooth the negative is exposed to the X-rays for not more than 2 to 3 seconds, and a posterior tooth is exposed to the X-rays for not more than 3 to 4 seconds in each instance using a 3 inch gap, 10 milliampere X-ray tube. Thus for a full series of from 10 to 20 exposures, averaging 3 milliamperes per second of exposure, only from 30 to 60 milliampere seconds is totalled as compared with 60 to 120 milliampere seconds of exposure under the old method. The patient and attendants are thus subjected to one half of the X-ray exposures and the life of the X-ray tube is doubled. Considerable time is saved not only due to the shortened total exposure necessary but also for the reason that constant use heats the X-ray tube and makes it soft, i. e. impairs the vacuum thereof, so that time must be taken to cool the tube between exposures, or the tube must be changed. Furthermore, no special viewing lamp is required with this negative when used with the improved mount.

An example of the advantages of the invention, in use, is illustrated in comparison with what is known to the trade as "extra fast" films. These generally require about 1½ seconds exposure for an anterior tooth and about 2½ seconds exposure for a posterior tooth. With the improved mount a negative made with only a flash of the X-ray is needed, i. e. an X-ray is made just as quickly as the button can be pressed and released.

These and other objects of the invention and the means for their attainment will be more apparent from the following detailed description taken in connection with the accompanying drawings illustrating embodiments of the invention in which:

Figure 1 is a view of the improved mount with a lightly exposed negative therein which may be examined by light falling directly on the face of the negative from any source of illumination.

Figure 2 is a section on the line 4—4 of Figure 1.

Figures 3 and 4 are views similar to Figures 1 and 2, but showing a modification of the invention in which the reflecting surface is carried on a flap formed on the mount.

Figure 5 is a view similar to Figure 1, but showing a mount provided with a plurality of windows, the negatives being shown in outline only.

Heretofore X-ray mounts have generally taken the form of a frame 7 defining a window 8 behind which is secured, as at three points 9, a sheet of clear transparent, or frosted or opaline celluloid 10. Such celluloids are translucent and permit light from a light source in back of the frame 7 to pass through the backing 10, and through a negative 11 which may be carried in the window, i. e inserted between the celluloid sheet 10 and the rear face of the frame 7 through that side not fastened by the securing means 9.

Such a mount is intended for use with X-ray negatives made from what is known as "regular" films which require subjection to X-rays, for from 4 to 7 seconds or from "extra fast" films requiring 1½–2½ milliamperes seconds exposure, when emanating from a 10 milliampere power 3 inch gap X-ray tube. When viewed with the light from an ordinary light source falling directly on the face of the negative, the negative appears dark gray, with hardly any outline of an image. The negative in the mount is therefore always read by holding it up in front of a special viewing lamp so that the light passes from the source of light through the negative to the eye. Such viewing light must be subdued and is generally afforded by a frosted or a porcelain bulb or by an ordinary bulb behind a milk glass.

The present invention contemplates the provision of an improved mount for X-ray negatives which shall obviate the necessity for a viewing lamp by permitting the negative to be viewed by light of any kind falling directly thereon. This is accomplished by the use of a film exposed for a shorter period of time and producing a negative which appears, as in Figure 3, considerably lighter than the negative illustrated in Figure 1, the image, however, being sharp and clear permitting a proper and intelligent diagnosis to be made therefrom. The mat or frame 14 may be substantially similar to the frame 7 and have one or a plurality of windows 16 formed therein. Behind the window 16, and in lieu of the transparent or translucent opaline celluloid sheet 10, there is secured on three sides, as at 17, a sheet of white opaque celluloid 18 having a glazed or polished white surface of an opacity which would render the viewing of the usual negative by transmitted light impossible but which when a lighter negative 19 is used, permits the negative to be read by light of any character, either artificial or natural, falling directly on the face of the negative. As so viewed, the lighter or lightly exposed negative has the general appearance of a photographic print, although none of the details ordinarily lost in the subsequent process of printing an ordinary X-ray, are lost.

In lieu of an opaque sheet of celluloid 18, the opaque mount 21 formed with one or more windows 22, may have secured thereto or integral therewith, a reversely bent, projecting flap 23 adapted to extend behind or across the window and have secured on the face seen through the window 22, a sheet 24 of white opaque celluloid or a white glazed or smoothly polished or similarly surfaced paper or the like between which and the mount a lighter negative 19 may be inserted.

These negatives 19 are sufficiently light and transparent so that upon being placed against an opaque white polished or glazed surface, light from an ordinary light source falling directly upon the face of the negative may pass through the negative to the white reflecting surface and be again reflected through the negative from the white reflecting surface to thereby cause the image on the negative to stand out clearly for the purpose of examination and diagnosis. Such a light and transparent negative is obtained by the use of an ordinary, or as it is known to the trade, a "regular" X-ray film which is exposed to a 10 milliampere, 3 inch gap X-ray tube for not above 2 to 3 seconds for an anterior tooth and for not more than 3 to 4 seconds for a posterior tooth. Thus for a full series of from 10 to 20 exposures averaging 3 milliamperes per second of exposure, only from 30 to 60 milliampere seconds exposure is totalled as compared with 60 to 120 milliampere seconds of exposure, under the old method. Thus the patient and attendants are subjected to the deleterious effects of the X-rays for one half the regular time; the life of the X-ray tube is doubled and considerable time is saved not only due to the shortened exposures but also because the shorter exposures do not cause as much heating of the tube and impairment of its vacuum, obviating the need of interchange of tubes. Furthermore, since the negative may be viewed by light of any character either natural of artificial falling directly on the face of the negative no special viewing lamps or other equipment involving an additional expense is necessary.

Obviously a mount of the character described may be provided with one or a plurality of windows 16 or 22 and any backing therefore may be provided so long as the principle of a white reflecting surface of a glazed or highly polished nature is involved and any material either paper or celluloid or any other substance may be availed of to provide this reflecting surface.

What I claim is:

An improved device adapted to assist in dental X-ray diagnosis comprising a flexible panel, an aperture therein, a white opaque flexible backing in the rear of the panel and adjacent the aperture and secured to the panel, and an X-ray film containing an incompletely formed X-ray image, positioned between the panel and the white opaque backing, whereby the film may be viewed in reflected light to bring out clearly the details of the photographed object.

In testimony whereof I affix my signature.
ISIDORE S. BERGER.